United States Patent [19]

Suzuki et al.

[11] Patent Number: 4,971,116
[45] Date of Patent: Nov. 20, 1990

[54] PRESSURE CONTROL VALVE

[75] Inventors: Akira Suzuki; Katsuya Tanaka, both of Aichi, Japan

[73] Assignee: Aisin AW Kabushiki Kaisha, Japan

[21] Appl. No.: 430,413

[22] Filed: Nov. 2, 1989

[30] Foreign Application Priority Data

Nov. 9, 1988 [JP] Japan .................. 63-281413

[51] Int. Cl.$^5$ .......................... F15B 13/044
[52] U.S. Cl. .................. 137/625.65; 251/129.16
[58] Field of Search ............... 137/625.65; 251/129.16

[56] References Cited

U.S. PATENT DOCUMENTS

| | | |
|---|---|---|
| 2,858,487 | 10/1958 | Immel . |
| 3,880,476 | 4/1975 | Belart et al. . |
| 4,250,922 | 2/1981 | Will et al. . |
| 4,316,599 | 2/1982 | Bouvet et al. . |
| 4,535,816 | 8/1985 | Feder et al. . |
| 4,579,145 | 4/1986 | Leiber et al. . |
| 4,605,197 | 8/1986 | Casey et al. . |
| 4,662,605 | 5/1987 | Garcia . |
| 4,838,313 | 6/1989 | Kobayashi et al. ............ 137/625.65 |
| 4,838,517 | 6/1989 | Miki et al. ................ 137/625.65 |
| 4,838,518 | 6/1989 | Kobayashi et al. ............ 137/625.65 |
| 5,635,683 | 1/1987 | Nielsen . |

FOREIGN PATENT DOCUMENTS

| | | |
|---|---|---|
| 2255272 | 11/1972 | Fed. Rep. of Germany . |
| 60-52509 | 4/1985 | Japan . |
| 63-298414 | 12/1988 | Japan . |
| 63-298415 | 12/1988 | Japan . |
| 63-298416 | 12/1988 | Japan . |
| 63-298417 | 12/1988 | Japan . |
| 1117872 | 3/1983 | United Kingdom . |

Primary Examiner—Gerald A. Michalsky
Attorney, Agent, or Firm—Lorusso & Loud

[57] ABSTRACT

A pressure control valve including an electromagnet portion, a pressure governing valve portion coupled to the electromagnet portion and hydraulic oil enclosed in said electromagnet portion. The pressure governing valve portion includes a valve sleeve and a spool valve slidably mounted in the valve sleeve so that an output pressure corresponding to an input signal to the electromagnet portion is provided. The electromagnet portion includes a push rod which slides in tandem with the spool valve, a core surrounding the push rod, a coil assembly disposed on the outer surface of the core, and a plunger secured to the push rod so that the spool valve slides responsive to the input signal. An oil passage is provided between the core and the coil assembly as that movable portions of the electromagnet portion move without any resistance from the hydraulic oil.

18 Claims, 4 Drawing Sheets

PRESSURE CONTROL VALVE

BACKGROUND OF THE INVENTION

The present invention relates to a pressure control valve, and, more particularly, to a pressure control valve capable of controlling fluid pressure in response to an electric signal.

Pressure control valves are represented by a diaphragm type pressure control valve, wherein the surface of the diaphragm receives feedback pressure, and a spool type pressure control valve wherein the end surface of the spool receives feedback pressure. The present invention relates to an electromagnetic pressure-control valve of the spool type.

The spool type electromagnetic pressure-control valve is usually designed in such a manner that a load caused by the electromagnet, a spring load, and an output pressure feedback load act on a spool valve which slides in a valve sleeve having a supply port, an output port, and an exhaust port. The output pressure is controlled to a level which corresponds to the electric signal supplied to the electromagnet portion by arranging the balance among the above-described loads (see Japanese Patent Laid-Open No. 60-52509).

The pressure control valve of the type described above is usually operated at a temperature about 150° C. in the case where the valves are included in hydraulic pressure control circuits for automatic transmissions for automobiles. The higher the hydraulic oil temperature becomes, the more hydraulic pressure vibrations are generated, causing pulsations.

Hitherto, the above-described hydraulic pressure vibrations present at high temperatures are prevented by causing a damping effect by having the electromagnet portion constituting the pressure control valve filled with hydraulic oil. That is, even if the plunger tries to vibrate in synchronization with the hydraulic pressure vibrations, the viscous resistance of the enclosed hydraulic oil prevents the plunger from vibrating.

However, the conventional pressure control valve of the type described above causes a problem in that hydraulic oil thus enclosed in the electromagnet portion interrupts the smooth operation of the pressure control valve when the pressure control valve must be operated at low temperature in the case where, for example, the automobile is operated in winter. That is, the viscosity of the hydraulic oil is inevitably raised at low temperature, causing the hydraulic oil to become a viscous fluid acting as a resistance interrupting the movement of the movable portions in the electromagnet portion of the pressure control valve. This leads to a problem in that the pressure governing valve portion deteriorates as regards its designed hydraulic pressure response with respect to the electric signal. As a result, the pressure control valve cannot be reliably operated.

SUMMARY OF THE INVENTION

An object of the present invention is to provide a pressure control valve capable of overcoming the above-described problems experienced with the conventional pressure control valves, thus preventing hydraulic pressure vibrations at high temperature, whereby the pressure governing valve portion thereof maintains an excellent hydraulic pressure response at low temperature.

In order to achieve the above-described object, there is provided a pressure control valve arranged such that an electromagnet portion is coupled to a pressure governing valve portion and hydraulic oil is enclosed in the electromagnet portion, the pressure governing portion including: a valve sleeve having a supply port, an output port, and an exhaust port; and a spool valve slidably mounted in the valve sleeve and receiving a load caused by the electromagnet, a spring load, and an output pressure feedback load.

The electromagnet portion comprises: a push rod capable of moving together with the spool valve; a core surrounding and slidably supporting the push rod; a coil assembly disposed on an outer surface of the core; and a plunger secured to an end portion of the push rod.

Between the core and the coil assembly there is provided an oil passage extending axially.

The spool valve received the output pressure feedback load in the same direction as that of the spring load or in the same direction as that of the load from the electromagnet.

It is preferable that the oil passage be in the form of a groove formed in the coil assembly.

Furthermore, it is preferable that the core be provided with a flange portion, an oil passage be formed in the flange portion and the plunger, and a small-diameter portion and a large-diameter portion be provided with a step therebetween portion on the outer surface of the core.

According to the structure of the present invention as described above, the pressure governing valve portion includes the valve sleeve with the supply port, the output port, and the exhaust port, and the spool valve slidably mounted in the valve sleeve and receiving the load from the electromagnet, the spring load, and the output pressure feedback load. Therefore, an output pressure level corresponding to an input signal to the electromagnet portion can be obtained at the output port.

Therefore the electromagnet portion comprises a push rod secured to the spool valve for moving in tandem with it; a core surrounding and capable of slidably supporting the push rod; a coil assembly disposed on an outer surface of the core; and a plunger secured to an end portion of the push rod. As a result, the plunger can be moved and the spool valve can thereby be moved via the push rod by varying the input signal.

The pressure governing valve portion and the electromagnet portion are in communication with each other and the electromagnet portion is filled with hydraulic oil.

Since an oil passage extending axially is formed between the core and the coil assembly, hydraulic oil enclosed in the electromagnet can freely move via the oil passage. Therefore, moveable portions of the electromagnet portion, such as the plunger, are able to move without any resistance from the hydraulic oil when an electric signal is supplied to the electromagnet. Consequently, the hydraulic pressure of oil in the pressure governing valve portion can be controlled reliably.

As a result, the above-described hydraulic pressure vibrations at high temperature can be prevented. Furthermore, the hydraulic pressure response of the pressure governing valve portion at low temperature can be retained satisfactorily. Consequently, a reliable pressure control valve is provided.

BRIEF DESCRIPTION OF DRAWINGS

The structure and features of the pressure control valve according to the invention will be seen by reference to the following drawings in which.

DESCRIPTION OF PREFERRED EMBODIMENT

Figure 1:
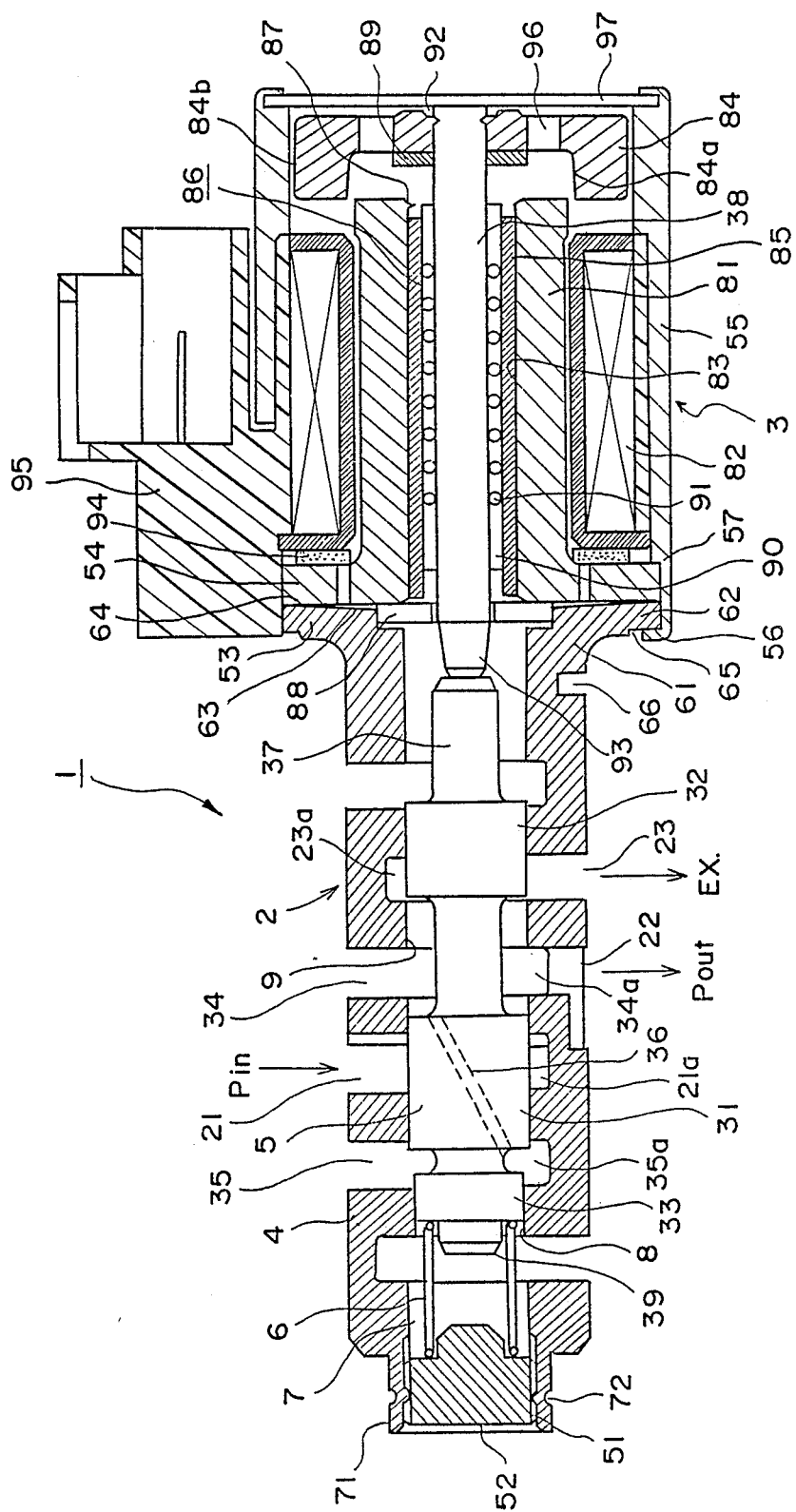
FIG. 1 is a cross sectional view which illustrates a first embodiment of a pressure control valve according to the present invention.

Referring to FIG. 1, a pressure control valve 1 comprises a pressure governing valve portion 2 and an electromagnet portion 3. The pressure governing valve portion 2 comprises a valve sleeve 4 and a spool valve 5. A large-diameter hole 7 accommodating a spring 6, and, next to it, a small-diameter guide hole 8 and an intermediate-diameter guide hole 9 for the sliding movement of the spool valve 5 are formed in the valve sleeve 4 in the form of axial through holes.

A radially extending supply port 21, an exhaust port 23, and an output port 22 are successively formed in the sequential order described above, from left to right when viewed in the drawing, in the valve sleeve 4. In order to make the flow of oil smooth at each of the ports, annular cutout portions 21a, 23a, 34a, and 35a are, if necessary, provided.

The spool valve 5 has two land portions 31 and 32 having the same diameter and which are slidably received in the above-described intermediate-diameter guide hole 9. The spool valve 5 further has a small-diameter land portion 33 formed next to the land portion 31 and which is slidably received the small-diameter guide hole 8. The distance between the two land portions 31 and 32 having the same diameter is determined so as to enable the output port 22 to alternately communicate with the supply port 21 and the exhaust port 23 at a predetermined ratio when the spool valve 5 slides. A space 34 formed between the land portions 31 and 32 is always connected to the output port 22.

A closed space 35 formed by the land portion 31, the small-diameter land portion 33, and guide holes 8 and 9 is connected to the space 34 formed between the land portions 31 and 32 by a feedback oil passage 36. The feedback oil passage 36 diagonally penetrates the land portion 31 so that output pressure obtained at the output port 22 is fed back to the closed space 35.

A column portion 37 projecting over the central portion of the end surface of the same-diameter land portion 32 is arranged for contact with a push rod 38 of the electromagnet portion 3 to be described later, while a guide member 39 projecting from the central portion of the end surface of the small-diameter land portion 33 guides the above-described spring 6.

In order to apply a load to the spring 6, the hole 7 formed through the valve sleeve 4 has a female screw member 51 formed thereon, and a male screw member 52 which is adapted to be screwed with the female screw member 51 is inserted therein. As a result, the spring 6 can be abutted against the end surface of the spool valve 5 by screwing the male screw member 52 into the hole 7. Therefore, the compression degree of the spring 6 can be varied by adjusting the angular degree of the rotation of the male screw member 52.

When the pressure governing valve 2 is assembled, first the spool valve is inserted into the hole 8 formed in the valve sleeve 4 with the small-diameter land portion 33 positioned at an end portion of the hole 8. On the other hand, the spring 6 is inserted from the hole 7 so as to surround the guide member 39 and to come contact with the end surface of the small-diameter land portion 33. Thus, the spring 6 is compressed by a predetermined degree by screwing the male screw member 52 into the female screw member 51 formed in the valve sleeve 4.

The pressure governing valve portion 2 thus assembled can be coupled with the electromagnet portion 3 by abutting a flange portion 53 formed at an end portion of the valve sleeve 4 adjacent to the hole 7 against a flange portion 54 of the electromagnet 3, and by curling an end portion 56 of case 55. In order to facilitate curling the end portion 56 of the case 55, a stepped portion 57 is formed on the inner surface of the case 55 at a position confronting the flange portion 54. Thus, the curling is conducted with the flange portion 54 positioned on the shoulder portion of the stepped portion 57.

The flange portion 53 is constituted by a thick wall portion 61 and a thin wall portion 62, the thick wall portion 61 having a tapered portion 63 and its end surface. The tapered portion 63 is provided for the purpose of forming a recess when the flange portion 53 is abutted against the flange portion 54. That is, the two flange portions 53 and 54 contact each other at only a peripheral portion 64 by virtue of the recessed portion thus formed. Therefore, only the periphery portion 64 needs to be subjected to a surface working for the two flange portions 53 and 54 to be brought into proper contact with each other. This facilitates the assembling work.

On the peripheral portion of the above-described thin wall portion 62 an annularly stepped portion 65. The annularly stepped portion 65 is provided for the purpose of shortening the length of the assembled pressure control valve 1. That is, since the pressure control valve 1 is to be located in a limited space, it must be shortened within the limits of possibility. Therefore, it is preferable that the thickness of each of the flange portions 53 and 54 be small. However, it is very difficult for the thickness of each of the two flange portions 54 and 54 to be reduced since their strength is thereby weakened. In order to overcome the problem above, the thick wall portion 61 has a constant thickness and the above-described annularly stepped portion 65 is formed in the thin wall portion 62 next to the thick wall portion 61. As a result, the length of the completed electromagnet portion 3 can be shortened by a degree corresponding to the size of the annular stepped portion 65.

A cutout 66 is provided for the purpose of aligning the supply port 21, the exhaust port 23, the output port 22 and, for example, a hydraulic pressure control system for an automobile (omitted from illustration).

After the pressure governing valve portion 2 and the electromagnet portion 3 have been coupled to each other, the above-described male screw member 52 is rotated so as to move axially in the female screw member 51. As a result, the degree of compression of the spring 6 is adjusted with an electric current supplied to the electromagnet 3. After the adjustment has been made, a projecting portion 71 in which the female screw member 51 is formed is crimped from outside as designated by reference numeral 1 in FIG. 72 so that the male screw member 52 is fixed. In order to facilitate the crimping, a portion of the above-described projecting portion 71 is formed with a thin wall.

Next, the electromagnet portion 3 will be described.

The electromagnet portion 3 comprises the cylindrical case 55 made of a magnetic material, the case 55 accommodating a cylindrical thick wall core 81 similarly made of magnetic material. The core 81 is disposed in such a manner that the flange portion 54 formed at an end portion thereof engages to the flange portion 53 of the above-described valve sleeve 4. In the inner part of a cylindrical space formed by the case 55 and the core 81 there is provided a coil assembly 82 secured therein. Thus, a stationary portion is constituted by the cylindrical case 55, the core 81, and the coil assembly 82.

On the other hand, a movable portion is constituted by the push rod 38 inserted into a hollow portion 83 of the core 81 and a plunger 84 similarly made of magnetic material and secured to another end portion of the push rod 38, the plunger 84 being arranged to be attracted by the coil assembly 82.

The plunger 84 is secured to another end portion of the push rod 38, that is on the side which is away from the pressure governing valve portion 2 and is formed in a thick annular shape. The plunger 84 has a cylindrical recessed portion 84a formed at its central portion on its side confronting the core 81. The recessed portion 84a can receive an end portion of the core 81 with a small clearance kept therefrom when the plunger 84 is attracted as described above. Furthermore, an outer surface 84b of the plunger 84 is arranged to confront the inner surface of the above-described case 55 with a small clearance kept therefrom similarly.

In the hollow portion 83 in the core 81 there is provided a linear type rolling bearing 86 disposed in a sleeve 85. As shown in FIG. 1, after the sleeve 85 has been inserted into the hollow portion 83 of the core 81, three protrusions 87 at an end surface of the core 81 are formed to retain the sleeve 85.

The linear type rolling bearing 86 accommodated in the sleeve 85 is able to move freely within the space in the sleeve 85 between the stoppers 88 and 89. The linearly type rolling bearing 86 is constituted by a brass bearing cage 90 and balls 91 accommodated in a through hole formed in the bearing cage 90, the balls 91 being arranged to slightly project over both the outer and inner surfaces of the bearing 86. The push rod 38 is supported via the thus-disposed balls 91 relative rotation between the push rod 38 and the sleeve 85.

The push rod 38 is made of a non-magnetic material, for example, stainless steel having a nitride surface forming a nitrided layer providing wear resistance. The plunger 84 is secured to an end portion of the push rod 38 as designated by reference numeral 92 by locking into an annular recess thereon. Another end portion of the push rod 38 has a tapered portion 93 formed in its portion confronting the column portion 37 of the spool valve 5 so that locking with the plunger 84 cannot occur unless the assembling is correct.

A ring 94 made of unwoven fabric is inserted between the end surface of the coil assembly 82 and the flange portion 54 of the core 81 so as to serve as a filter for removing foreign matter from the oil.

A connector 95 capable of supplying electricity to the electromagnet portion 3 is secured on the outer surface of the case 55.

The plunger 84 has an oil-passage hole 96. As a result, although oil enclosed in the electromagnet portion 3 for the purpose of preventing hydraulic pressure vibrations at high temperature acts as a resistance when the plunger 84 is moved, oil can freely pass through the oil passage hole 96 thus formed, causing the resistance to be reduced.

A cover member 97 closes an end portion of the case 55 adjacent the plunger 84.

When the electromagnet portion 3 is assembled, the core 81 to which the ring 94 and the coil assembly 82 are attached is inserted into the case 55 from one end and the flange portion 54 of the core 81 is positioned and secured by using the stepped portion 57 formed on an end of the inner surface of the case 55 so that a stationary portion is formed.

The plunger 84 is secured onto the other end of the push rod 38 to form a movable portion. Then, the stopper 89 is inserted, and an end portion of the push rod 38 is inserted the opposite end of the case 55 and accommodated in the linear type rolling bearing 86 via the sleeve 85.

Then, the flange portion 53 formed at the opposite end of the valve sleeve 4 and the stopper 88 are inserted into the case 55 at one end of the electromagnet portion 3. Then, the end portion 56 of the case 55 is curled around the flange portion 53 of the valve sleeve 4. As a result, the assembly of the pressure control valve 1 is completed.

With the structure according to the present invention as described above, when hydraulic oil is supplied to the supply port 21 of the valve sleeve 4 from a pump or the like, the oil from the supply port 21 then reaches the land portions 31 and 32 formed on the surface of the spool valve 5 via an opening formed between the valve sleeve 4 and the land portion 31 formed on the surface of the spool valve 5. Then, the oil passes through the output port 22 of the valve sleeve 4 before being supplied to hydraulic devices in the hydraulic control system such as an automatic transmission.

Pressure P of the hydraulic pressure oil outputted through the output port 22 is simultaneously fed back via the feedback oil passage 36. Pressure P is transmitted to the closed space 35 formed by the land portion 31, the small-diameter land portion 33 which is formed next to the land portion 31, and the valve sleeve 4 so that it is applied to the land portion 31 and the small-diameter land portion 33. As a result, an output pressure feedback load is generated which corresponds to the area difference $A_1 - A_2$ given by subtracting cross sectional area $A_2$ of the small-diameter land portion 33 from cross sectional area $A_1$ of the land portion 31.

The thus generated pressure feedback load $(A_1 - A_2)P$ is added to force $F_{sp}$ which is the urging force of the spring 6. Thus, the spool valve 5 is pressed to right when viewed in the drawing with a synthesized force $(A_1 - A_2)P + F_{sp}$. As a result, the spool 5 moves to displace its position in the valve sleeve 4 to the position at which the above-described synthesized force balances with force $F_{sol}$ generated by the electromagnet portion 3.

As a result of the movement of the spool valve 5, the land portions 31 and 32 move so that the supply port 21 and the exhaust port 23 of the valve sleeve 4 are controlled in such a manner that they are opened/closed at a predetermined rate with respect to the output port 22. As a result, control is so conducted that output pressure P at the output port 22 holds to the following equation in response to an electromagnetic signal inputted to the electromagnet portion 3:

$$P = (F_{SOL} - F_{sp})/(A_1 - A_2)$$

The electromagnet portion 3 is filled with hydraulic oil for use in the hydraulic control system in order to prevent hydraulic pressure vibrations at high temperature. The thus enclosed hydraulic oil causes no problem during the driving of an automobile at high temperature in hot season or the like. However, the hydraulic oil becomes a resistance against the movement of the movable portion in the electromagnet portion 3 such as the push rod 38 or the plunger 84 when an automobile is driven at low temperature in a cold season or the like.

Figure 2:
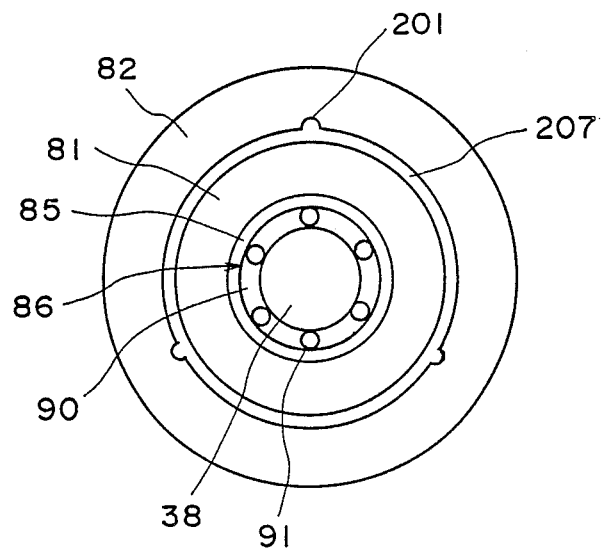
FIG. 2 is a lateral cross sectional view which illustrates an essential portion of an electromagnet portion.

In order to overcome the problem described above, according to this embodiment, an oil passage 201 in the shape of a groove having a diameter through which hydraulic oil can pass is, as shown in FIG. 2, formed between the core 81 constituting the electromagnet portion 3 and the coil assembly 82.

Although the oil passage 201 is constituted by three grooves confronting the inner surface of the coil assembly 82 according to the structure shown in FIG. 2, it may be formed to confront the core 81. However, if a large diameter groove is formed to confront the core 81, magnetic pass resistance increases. Therefore, it is preferable that the oil passage 201 be formed to confront the coil assembly 82.

Figure 3:
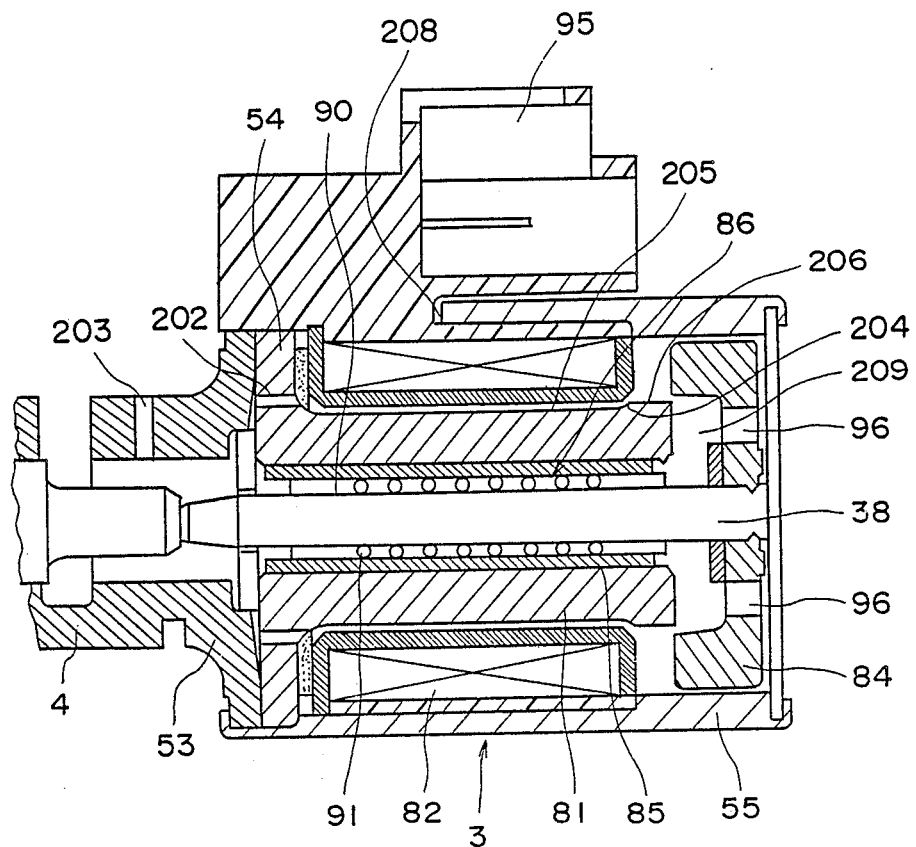
FIG. 3 is a vertical cross sectional view which illustrates an essential portion of the electromagnet portion.

As shown in FIG. 3, the core 81 has a small-diameter portion 205 and a large-diameter portion 206 formed by a stepped outer surface portion 204. An annular oil passage 207 can be formed between the core 81 and the coil assembly 82 due to provision of the small-diameter portion 205. Furthermore, the deterioration in the force attracting the plunger 84 is prevented by provision of the large-diameter portion 206.

Furthermore, an oil passage hole 96 is formed in the bottom of the plunger 84, an oil passage hole 202 is formed in the flange portion 54 of the core 81, and an oil passage hole 203 is formed in the vicinity of the flange portion 53 of the valve sleeve 4.

As a result of the above-described structure, hydraulic oil in an oil tank (omitted from illustration) is introduced into the electromagnet 3 through, for example, a gap 208 between the connector 95 and the case 55, and passes through the oil passage 201, the annular oil passage 207, and the oil passage holes 202 and 203. The hydraulic oil then returns to the oil tank. Furthermore, since hydraulic oil in an oil chamber 209 can freely move through the oil passage hole 96 formed in the plunger 84, the resistance against the movement of the plunger 84 is eliminated.

Figure 4:
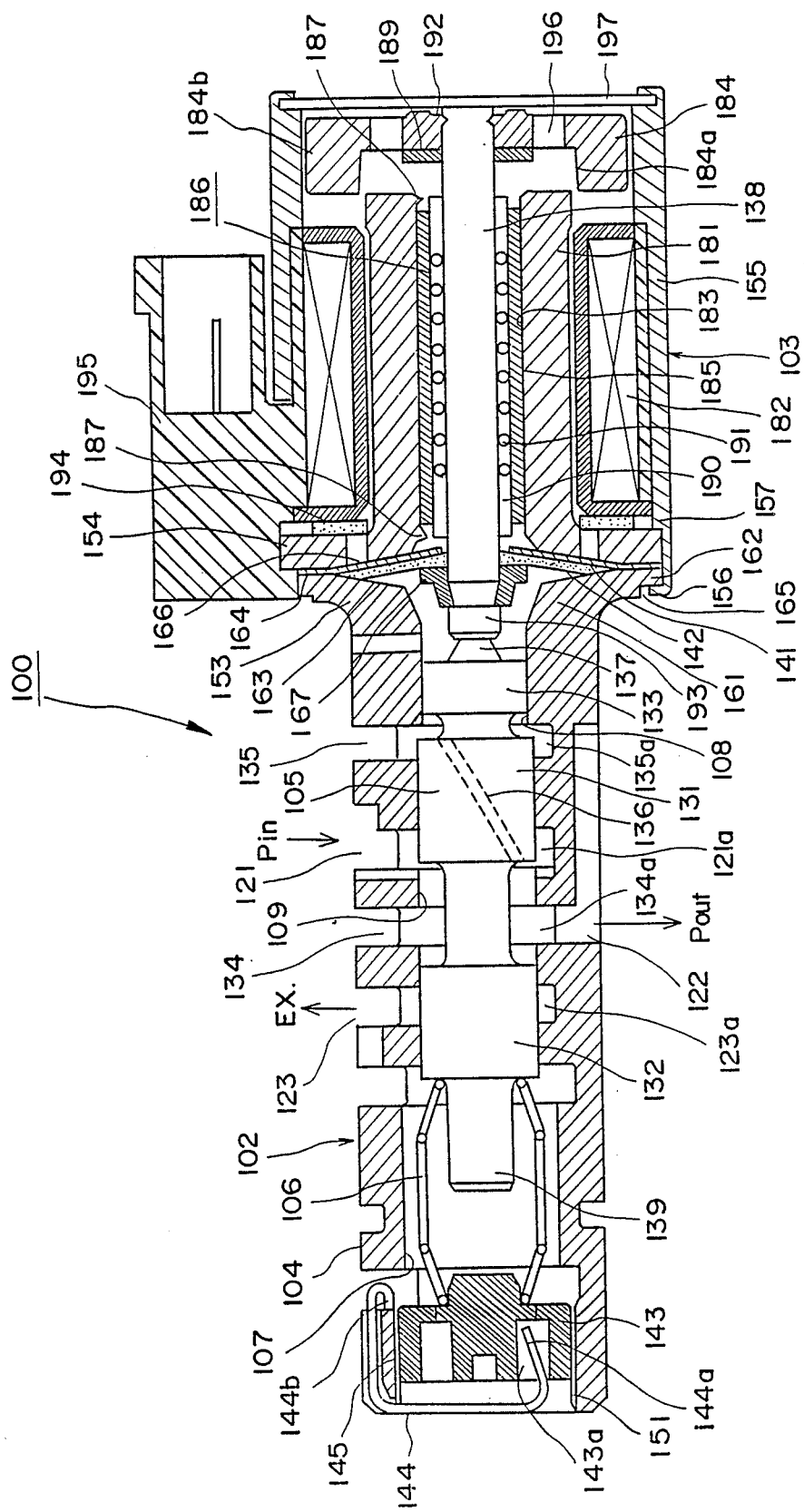
FIG. 4 is a cross sectional view which illustrates another embodiment of the pressure control valve according to the present invention.

A cross-section of the pressure control valve according to another embodiment of the present invention is shown in FIG. 4.

Referring to the drawing, reference numeral 100 represents a pressure control valve including a pressure governing valve portion 102 and an electromagnet portion 103 similar to the firs embodiment. The pressure governing valve portion 102 is constituted by a valve sleeve 104 and a spool valve 105.

Referring to FIG. 4 which illustrates the pressure control valve 100, reference numeral 106 represents a spring, 107 represents a large-diameter hole capable of accommodating the spring 106, 108 represents a small-diameter guide hole, and 109 represents an intermediate-diameter guide hole. Reference numeral 121 represents a supply port, 122 represents an output port, and 123 represents an exhaust port. The port portions in the valve sleeve 104 have annular cutouts 121a, 123a, 134a, and 135a.

The spool valve 105 comprises two land portions 131 and 132 having the same diameter and a small-diameter land portion 133 so that they form a space 134 and a closed space 135 in cooperation with the valve sleeve 104. A feedback oil passage 136 is formed in the land portion 131. Reference numeral 137 represents a projection portion, 138 represents a push rod, and 139 represents a column portion. Reference numerals 141, 187, and 189 represent stoppers.

The spring 106 is adjusted by driving a male screw member 143 into a female screw member 151. Reference numeral 143a represents a fastening hole, 144 represents a fitting pin, 144a represents a lower end portion of the fitting pin 144, and 145 represents a hole.

Reference numerals 153 and 154 represent flange portions of the valve sleeve 104 and the electromagnet portion 103, respectively. The two flange portions 153 and 154 are coupled to each other by curling over an end portion 156 of the case 155. Reference numeral 157 represents a stepped portion, 161 represents a thick wall portion, 162 represents a thin wall portion, 163 and 166 represent tapered portions, 164 represents a periphery portion, and 165 represents an annularly stepped portion.

The electromagnet portion 103 comprises: a stationary portion constituted by a cylindrical core 181 and a coil assembly 182; and a movable portion constituted by a plunger 184 and a push rod 138. Reference numeral 183 represents a hollow portion, 184a represents a recessed portion, 184b represents an outer surface, 185 represents a sleeve, 186 represents a linear type rolling bearing, 190 represents a bearing cage, 191 represents balls accommodated in the bearing cage 190, 193 represents a contact portion, 194 represents a ring made of unwoven fabric, 195 represents a connector, 196 represents an oil passage hole, and 197 represents a cover member.

The difference from the above-described first embodiment lies in the structure of the spool valve 105, in the valve sleeve 104 in the pressure governing valve portion 102, and in the structure coupling the pressure governing valve portion 102 and the electromagnet portion 103.

That is, the valve sleeve 104 has a large-diameter hole 107 capable of accommodating the spring 106, and, next to the hole 107, a small-diameter guide hole 108 for guiding sliding spool valve 105 it, and an axially extending intermediate-diameter guide hole 109.

A radially extending supply port 121, an output port 122, and an exhaust port 123 are successively formed in the sequential order described above from right to left when viewed in the drawing in the valve sleeve 104 in communication with the above-described guide hole 109. In order to make the flow of oil smooth at each of the ports, annular cutout portions 121a, 123a, 134a, and 135a are, if necessary, formed.

The spool valve 105 has two land portions 131 and 132 of the same diameter and are guided by intimate sliding contact with guide hole 109, the spool valve 105 further having a small-diameter land portion 133 formed next to the land portion 131 and is guided by intimate sliding contact with the small-diameter guide hole 108. The distance between the two land portions 131 and 132 having the same diameter is determined so as to enable the output port 122 to alternately communicate with the supply port 121 and the exhaust port 123 at a predetermined ratio by the sliding of the spool valve 105. A space 135 formed between the land portions 131 and 132 is always connected to the output port 122.

A closed space 135 formed by the land portion 131, the small-diameter land portion 133, and the guide holes 108 and 109 is connected to the space 134 formed between the land portions 131 and 132 by a feedback oil passage 136. The feedback oil passage 136 diagonally penetrates the land portion 131 so that output pressure obtained at the output port 122 is fed back to the closed space 135.

The projecting portion 137 projecting from the central portion of the end surface of the small-diameter land portion 133 is arranged for contact with the push rod 138 of the electromagnet portion 103 to be described later, while a column portion 139 projecting from the central portion of the end surface of the land portion 132 serves as a member for restricting the stroke of the spool valve 105 as well serving as a guide for the spring 106.

In order to adjust the load of the spring 106, the hole 145 formed in the valve sleeve 104 has a female threads 151 formed therein, and a male screw member 143 is inserted therein. As a result, the spring 106 is forced against the end surface of the spool valve 105 by introducing the male screw member 143 into the hole 145. Furthermore, the compression of the spring 106 can be varied by adjusting the angular degree of the rotation of the male screw member 143.

When the pressure governing valve 102 is assembled, first the spool valve 105 is, from left, inserted into the guide hole 108 formed in the valve sleeve 104 with the small-diameter land portion 133 positioned at an end portion of the hole 108. On the other hand, the spring 106 is inserted from the hole 145 so as to surround the rod portion 139 and to come into contact with the end surface of the land portion 132. Thus, the spring 106 is compressed by a predetermined degree by screwing the male screw member 143 into the female screw member 151.

The joint between the pressure governing portion 102 and the electromagnet portion 103 is formed in such a manner that the linear type rolling bearing 186 accommodated in the sleeve 185 of the electromagnet 103 is able to move freely within the space in the sleeve 185 with movement limited by the stopper 141 comprising a belleville spring disposed at the left end portion of the push rod 138 and a brass stopper 189 disposed adjacent to the plunger 184. A member 142 made of unwoven fabric is provided for the stopper 141 at a position adjacent to the pressure governing valve 102. The unwoven fabric member 142 is secured by a stopper ring 167.

With the structure according to this embodiment as described above, when pressurized fluid, such as hydraulic oil is supplied to the supply port 121 of the valve sleeve 104 from a pump or the like, the hydraulic oil from the supply port 121 then reaches the space 134 formed between the land portions 131 and 132 of the spool valve 105 after it has passed through an opening between the valve sleeve 104 and the land portion 131 of the spool valve 105. Then, the oil passes through the output port 122 of the valve sleeve 104 in constant communication with the space 134 before being supplied to each hydraulic device in the hydraulic control system such as an automatic transmission.

Pressure P of the hydraulic oil outputted through the output port 122 is simultaneously fed back via the feedback oil passage 136. Pressure P is transmitted to the closed space 135 formed by the land portion 131, the small-diameter land portion 133 which is formed next to the land portion 131, and the valve sleeve 104 so that it is applied to the land portion 131 and the small-diameter land portion 133. As a result, an output pressure feedback load is generated which corresponds to the area difference $A_1 - A_2$ given by subtracting cross sectional area $A_2$ of the small-diameter land portion 133 from cross sectional area $A_1$ of the land portion 131.

The thus generated output pressure feedback load $(A_1 - A_2)P$ is added to force $F_{SOL}$ which is generated by the electromagnet portion 103. Thus, the spool valve 105 is pressed to left when viewed in the drawing with a synthesized force $(A_1 - A_2)P + F_{SOL}$. As a result, the spool valve 105 moves in the valve sleeve 104 to the position at which the above-described synthesized force balances with force $F_{SP}$ which is the force received from the spring 106.

As a result of the movement of the spool valve 105, the land portions 131 and 132 move so that the supply port 121 and the exhaust port 123 of the valve sleeve 104 are controlled in such a manner that they are opened/closed at a predetermined rate with respect to the output port 122. As a result, the output pressure P at the output port 122 conform with the following equation in response to an electromagnetic signal inputted to the electromagnet portion 103:

$$P = (F_{SP} - F_{SOL})/(A_1 - A_2)$$

As many widely different embodiments of this invention may be made without departing from the spirit and scope thereof, it is to be understood that the invention is not limited to the specific embodiments described herein.

What we claim is:

1. A pressure control valve including an electromagnet portion, a pressure governing valve portion coupled to said electromagnet portion and hydraulic oil enclosed in said electromagnet portion, said pressure control valve comprising:
   (a) a valve sleeve having a supply port, an output port, and an exhaust port;
   (b) a spool valve mounted in said valve sleeve for sliding movement responsive to a load from the electromagnet portion, a spring load, and an output pressure feedback load;
   (c) a push rod slidable in tandem with said spool valve;
   (d) a core surrounding and slidably supporting said push rod;
   (e) a coil assembly disposed on the outer surface of said core;
   (f) a plunger secured to an end portion of said push rod; and
   (g) an oil passage extending axially between said core and said coil assembly.

2. A pressure control valve according to claim 1, wherein said spool valve receives said output pressure feedback load in the same direction as that of said spring load.

3. A pressure control valve according to claim 2, wherein said oil passage is in the form of a groove formed in said coil assembly.

4. A pressure control valve according to claim 3, wherein through oil passages are formed in a flange portion formed on said core and said plunger.

5. A pressure control valve according to claim 4, wherein said core includes a small-diameter portion and a large-diameter portion with a step therebetween on the outer surface of said core.

6. A pressure control valve according to claim 2, wherein through oil passages are formed in a flange portion formed on said core and said plunger.

7. A pressure control valve according to claim 6, wherein said core includes a small-diameter portion and a large-diameter portion with a step therebetween on the outer surface of said core.

8. A pressure control valve according to claim 1, wherein said spool valve receives said output pressure feedback load in the same direction as that of said load caused by said electromagnet portion.

9. A pressure control valve according to claim 8, wherein said oil passage is in the form of a groove formed in said coil assembly.

10. A pressure control valve according to claim 9, wherein through oil passages are formed in a flange portion formed on said core and said plunger.

11. A pressure control valve according to claim 10, wherein said core includes a small-diameter portion and a large-diameter portion with a step therebetween on the outer surface of said core.

12. A pressure control valve according to claim 8, wherein through oil passages are formed in a flange portion formed on said core and said plunger.

13. A pressure control valve according to claim 12, wherein said core includes a small-diameter portion and a large-diameter portion with a step therebetween on the outer surface of said core.

14. A pressure control valve according to claim 1, wherein said oil passage is in the form of a groove formed in said coil assembly.

15. A pressure control valve according to claim 14, wherein through oil passages are formed in a flange portion formed on said core and said plunger.

16. A pressure control valve according to claim 15, wherein said core includes a small-diameter portion and a large-diameter portion with a step therebetween on the outer surface of said core.

17. A pressure control valve according to claim 1, wherein through oil passages are formed in a flange portion formed on said core and said plunger.

18. A pressure control valve according to claim 17, wherein said core includes a small-diameter portion and a large-diameter portion with a step therebetween on the outer surface of said core.

* * * * *

UNITED STATES PATENT AND TRADEMARK OFFICE
CERTIFICATE OF CORRECTION

PATENT NO. : 4,971,116
DATED : November 20, 1990
INVENTOR(S) : SUZUKI et al

It is certified that error appears in the above-identified patent and that said Letters Patent is hereby corrected as shown below:

Col. 2, line 17, "received" should read --receives--;

line 40, after "Therefore" insert a comma --,--;

line 42, delete "capable of".

Col. 3, line 25, after "for" insert --guiding--.

Col. 4, line 5, after "valve" insert --5--;

line 28, "and" should read --at--;

line 39, after "62" insert --is--.

Col. 5, line 1, "numeral 1" should read --numeral 72-- and "FIG. 72" should read --FIG. 1--;

line 11, delete "to";

line 45, delete "early" insert --ear--;

line 50, after "91" insert --to enable--;

line 53, "nitride" should read --nitrided--.

UNITED STATES PATENT AND TRADEMARK OFFICE
CERTIFICATE OF CORRECTION

PATENT NO. : 4,971,116

DATED : November 20, 1990

INVENTOR(S) : Suzuki et al

It is certified that error appears in the above-identified patent and that said Letters Patent is hereby corrected as shown below:

Col. 6, line 50, "gi en" should read --given--;

line 53, after "generated" insert --output--;

line 57, after "spool" insert --valve--.

Col. 7, line 59, "firs" should read --first--.

Col. 8, line 51, after "guiding" insert --the-- and delete "it,".

Col. 9, line 4, "135" should read --134--.

UNITED STATES PATENT AND TRADEMARK OFFICE
CERTIFICATE OF CORRECTION

PATENT NO. : 4,971,116

DATED : November 20, 1990

INVENTOR(S) : Suzuki et al.

It is certified that error appears in the above-identified patent and that said Letters Patent is hereby corrected as shown below:

Col. 10, line 28, "conform" insert --conforms--.

Signed and Sealed this

Twenty-fifth Day of August, 1992

Attest:

DOUGLAS B. COMER

Attesting Officer

Acting Commissioner of Patents and Trademarks